United States Patent
Lantz

(10) Patent No.: US 10,392,177 B2
(45) Date of Patent: Aug. 27, 2019

(54) INSULATED SHIPPING CONTAINER AND METHOD OF MAKING

(71) Applicant: Vericool, Inc., Livermore, CA (US)

(72) Inventor: Gary W Lantz, San Juan Capistrano, CA (US)

(73) Assignee: Vericool, Inc., Livermore, CA (US)

( * ) Notice: Subject to any disclaimer, the term of this patent is extended or adjusted under 35 U.S.C. 154(b) by 765 days.

(21) Appl. No.: 14/756,163

(22) Filed: Aug. 10, 2015

(65) Prior Publication Data
US 2017/0043937 A1    Feb. 16, 2017

(51) Int. Cl.
*B65D 81/09*    (2006.01)
*B65D 81/38*    (2006.01)

(52) U.S. Cl.
CPC ......... *B65D 81/09* (2013.01); *B65D 81/3823* (2013.01); *Y02W 90/13* (2015.05); *Y02W 90/14* (2015.05)

(58) Field of Classification Search
CPC ............... B65D 81/09; B65D 81/1075; B65D 81/3216; Y02W 90/13
USPC ......................................................... 220/592
See application file for complete search history.

(56) References Cited

U.S. PATENT DOCUMENTS

| | | | |
|---|---|---|---|
| 3,995,736 A * | 12/1976 | Lawson | B65D 19/20 206/596 |
| 5,897,017 A | 4/1999 | Lantz | |
| 6,619,500 B1 * | 9/2003 | Lantz | B65D 81/3823 220/592.1 |
| 2003/0217948 A1 | 11/2003 | Lantz | |
| 2010/0098353 A1 * | 4/2010 | Mountain | E02B 3/108 383/1 |
| 2011/0127272 A1 | 6/2011 | Crespo et al. | |
| 2012/0279896 A1 * | 11/2012 | Lantz | B65D 25/16 206/584 |
| 2015/0017313 A1 * | 1/2015 | Zeeck | B29B 9/14 426/623 |

FOREIGN PATENT DOCUMENTS

| | | |
|---|---|---|
| GB | 2492195 | 12/2012 |
| UA | 89343 U | 4/2014 |
| WO | WO 94/10063 | 5/1994 |
| WO | WO 95/03974 | 2/1995 |

OTHER PUBLICATIONS

International Search Report and Written Opinion dated Nov. 17, 2016 from International Application No. PCT/US2016/043690.
European Search Report in European Application No. 16835605.3, dated Jun. 27, 2018, 7 pages.

* cited by examiner

*Primary Examiner* — Anthony D Stashick
*Assistant Examiner* — Raven Collins
(74) *Attorney, Agent, or Firm* — Fish & Richardson P.C.

(57) ABSTRACT

An improved insulated shipping container including an external or outer corrugated cardboard box, receiving an inner product box centrally disposed therein. Between the inner and outer cardboard boxes are plural strata or layers of insulating pellets compressed or compacted to a selected degree. Compression of the insulating pellets both interlocks these insulating pellets so as to prevent their migration during transit of the shipping container, and substantially reduces the interstitial space or volume that would otherwise exist among the pellets. The bulk insulating value of the pellets is significantly improved. The entire container is biodegradable, and may be composted.

17 Claims, 7 Drawing Sheets

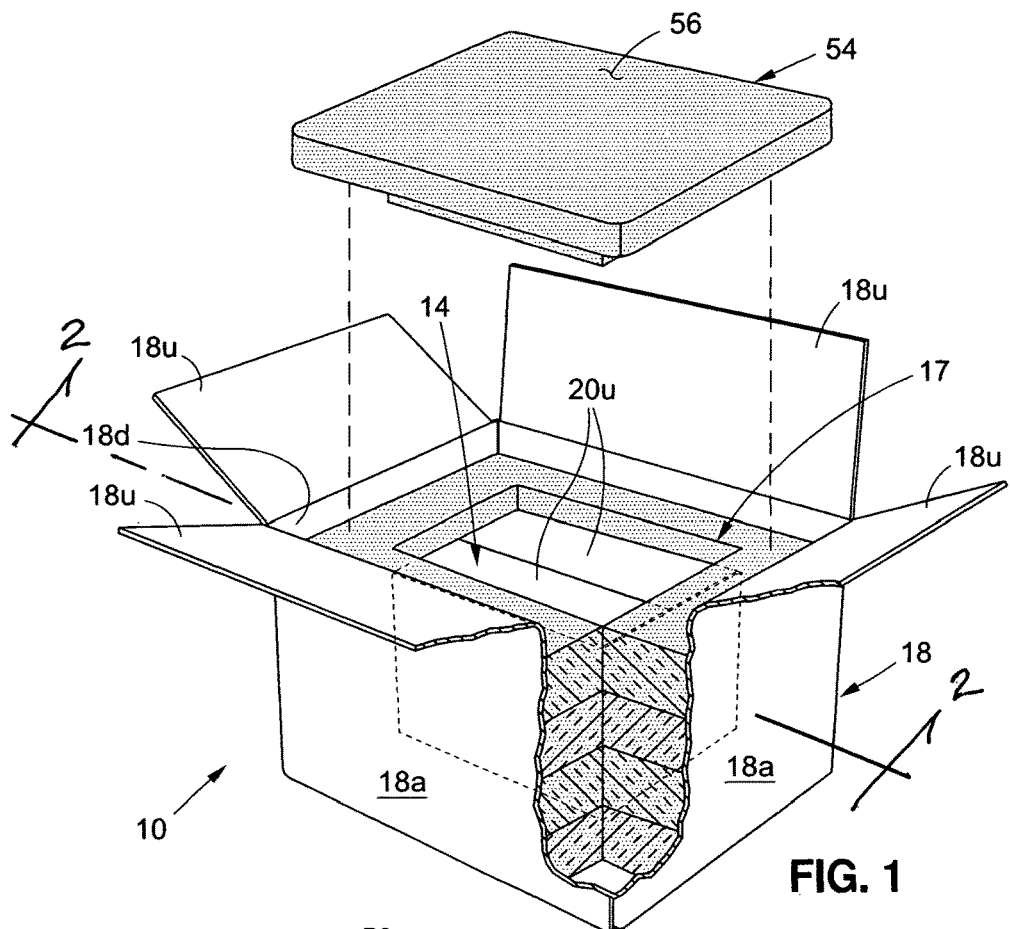
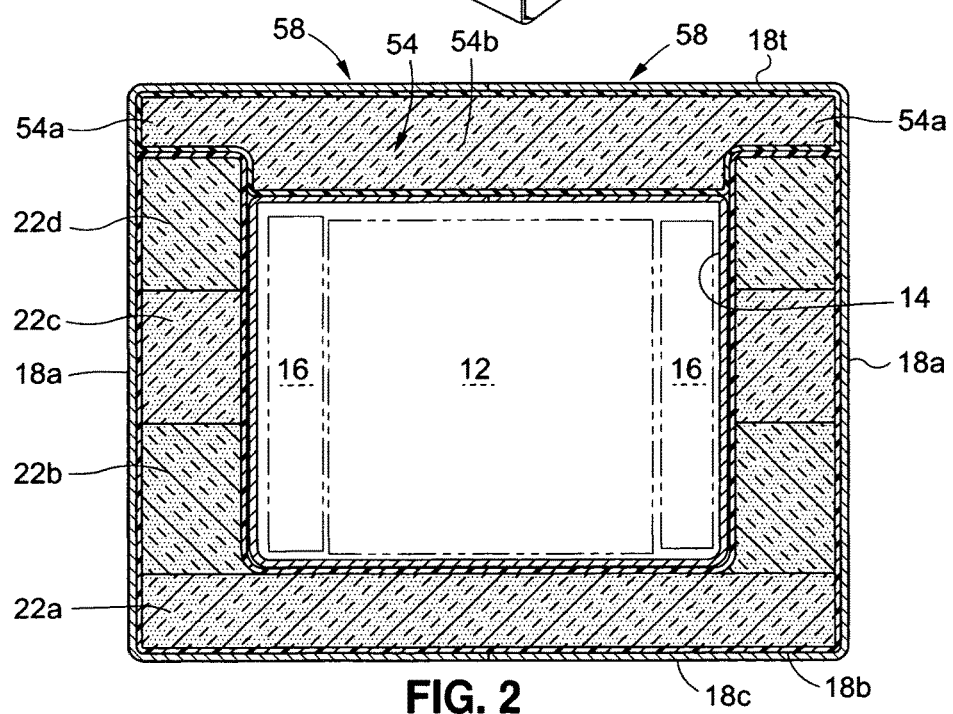

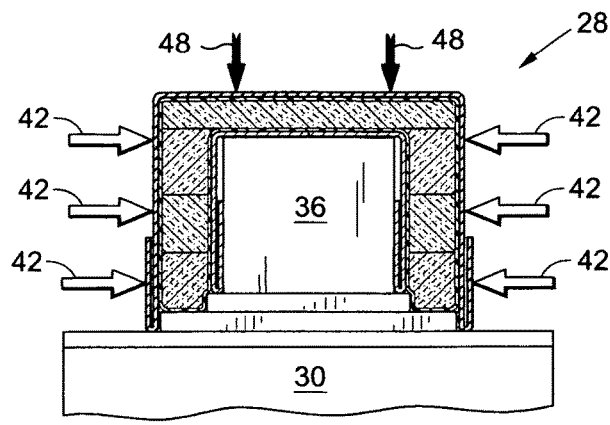
FIG. 12
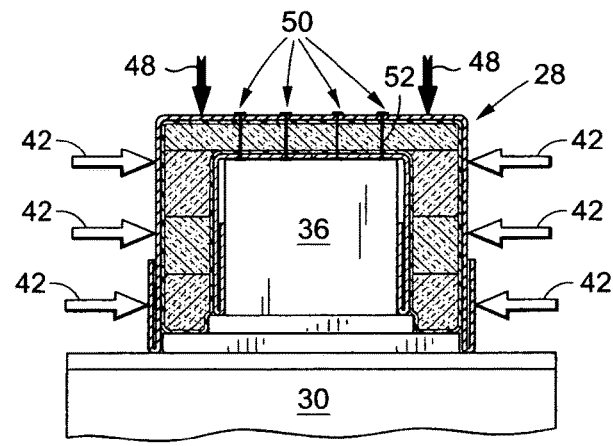
FIG. 13
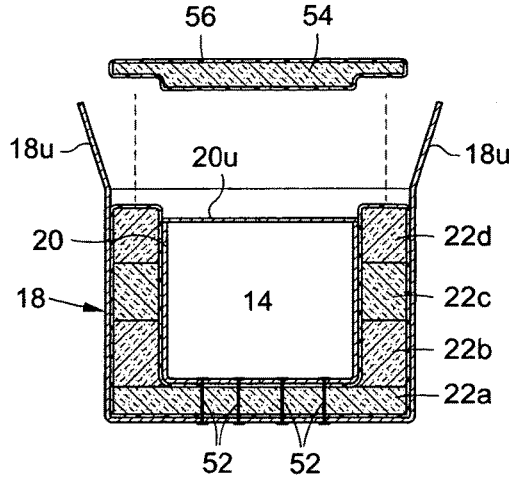
FIG. 14
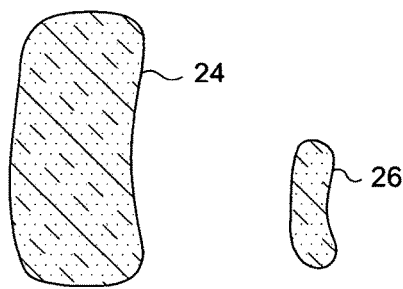
FIG. 15   FIG. 16

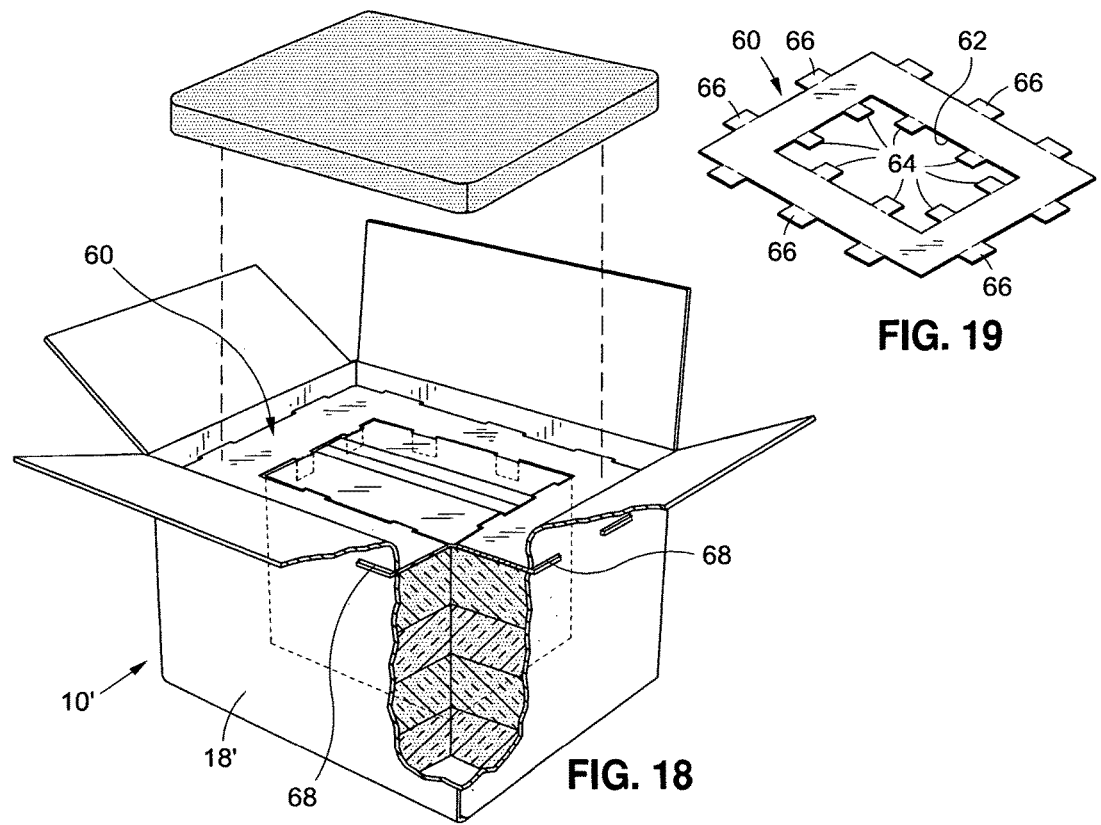
FIG. 19
FIG. 18
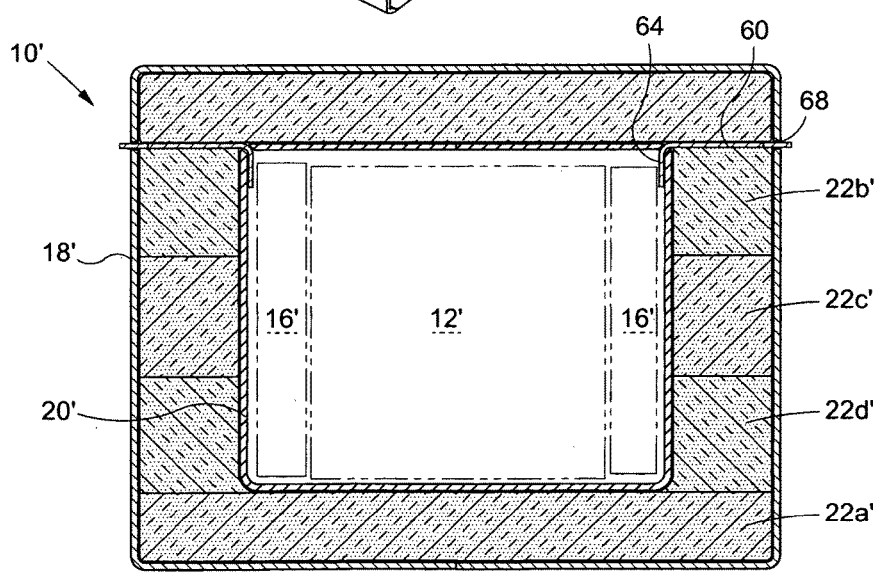
FIG. 20

INSULATED SHIPPING CONTAINER AND METHOD OF MAKING

BACKGROUND OF THE INVENTION

Field of the Invention

The present invention relates to an improved insulated shipping container; with all or substantially all of the component parts of this container suitable for recycling (i.e., which are biodegradable, or can be composted). Thus, a shipping container according to this invention may be considered environmentally friendly, or "green." More particularly, this invention relates to an insulated shipping container made essentially from selected biodegradable and compostable vegetable (i.e., plant based) materials. The most preferred insulating material being pelletized or granulated insulating material (i.e., vegetable starches); and which are also prevented from migration of the insulating material and shipped item during shipping.

In order to better protect item(s) being shipped, the present container is especially configured and constructed to provide both shock absorption; and to provide temperature regulation through the use of a combination of particulate insulation (i.e., insulation pellets or granules). In order to provide temperature regulation within the container, a cooling material, such as refrigerated gel packs or dry ice, for example, may also be employed.

Related Technology

Traditionally, containers for shipping temperature sensitive products have generally included conventional cardboard shipping containers (i.e., cardboard boxes, for example) having an insulating material therein. The insulating material may be simple loose-fill Styrofoam "peanuts," for example, in which a chunk of dry ice is placed along with the material to be shipped. Another variety of conventional insulated shipping container utilized panels or containers made of an insulating material, such as expanded polystyrene (EPS). EPS is a relatively inexpensive insulating material, and it may be easily formed into a desired shape, has acceptable thermal insulating properties for many shipping needs (i.e., typical R value of about 3.6 to about 4.0 per inch), and may be encapsulated or faced with protective materials, such as plastic film or metal foil, or plastic film/metal foil laminates.

Containers including EPS are often provided in a multi-piece (i.e., usually six pieces) modular form. Individual panels of EPS insulation, possibly wrapped in foil or the like, are preformed using conventional methods, typically with beveled, mitered, or square (i.e., 90°) edges. The panels are then inserted into a conventional cardboard box type of shipping container, one panel against the floor wall, and against each side wall, to create an insulated cavity within the container. In this arrangement, the beveled edges of adjacent panels form seams at the corners of the container. This configuration compromises insulation value by losses through the seams, called edge losses. A product is placed in the cavity and either a plug (such as a thick polyether or polyester foam pad), or an EPS lid is utilized, and is placed over the top of the product before the container is closed and prepared for shipping. In many cases, a coolant, such as packaged ice, gel packs, or loose dry ice, is placed around the product in the cavity to refrigerate the product during shipping.

Alternatively, an insulated body may be injection molded from expanded polystyrene (EPS), forming a cavity therein and having an open top to access the cavity. A product is placed in the cavity, typically along with coolant, and a cover is placed over the open end, such as the foam plug described above or a cover is also formed from EPS. In some uses, the brittle and breakable nature of EPS makes is less than satisfactory because of the possibility of damage to the container during transport.

For shipping particularly sensitive products, such as certain medical or pharmaceutical products, expanded rigid polyurethane containers are often used, as expanded polyurethane has thermal properties generally superior to EPS. Typically, a cardboard container is provided having a box liner therein, defining a desired insulation space between the liner and the container. Polyurethane foam is injected into the insulation space, substantially filling the space and generally adhering to the container and the liner. The interior of the box liner provides a cavity into which a product and coolant may be placed. A foam plug may be placed over the product, or a lid may be formed from expanded polyurethane, typically having a flat or possibly an inverted top-hat shape.

With all of the conventional shipping containers outlined above, many of the component parts of the container are not biodegradable, and recycling of the materials of the container is also problematic. Some countries, particularly the European countries, presently impose a tariff or tax on products that do not meet recycling guidelines. Many conventional insulated shipping containers do not meet these recycling guidelines, so that the costs of using such non-compliant containers is increased by the applied additional taxes. Particularly, insulated shipping containers of the type utilizing polyurethane foam injected into a space between an inner and an outer nested cardboard boxes create a particularly difficult disposal problem. When polyurethane is injected into such a container, it generally adheres substantially to the walls of both the inner and the outer cardboard box. Thus, the cardboard and insulation components may have to be disposed of together, entirely preventing recycling of the container.

Accordingly, there is a need for an improved insulated shipping container which is "green" with substantially all of the components of the container being either biodegradable, or recyclable, or both.

SUMMARY OF THE INVENTION

The present invention is directed generally to an improved insulated shipping container for shipping a temperature sensitive product in a temperature regulated condition, which container is entirely recyclable or biodegradable. Further, the container is to provide physical protection from shocks and bumps as commonly occur during transport on common carriers, such as truck freight and air freight carriers. Further, the present invention is directed to such an insulated container that has insulating properties (i.e., R value) favorably comparable to EPS containers.

One aspect of the present invention provides an improved insulating and cushioning shipping container, the shipping container comprising an exterior cardboard box defining a cavity, an inner cardboard box within the cavity, the inner cardboard box defining a product cavity, a compressed mass of insulating material of pellet/granular form received in the cavity and around the inner cardboard box; and the compressed mass of insulating material having a compression ratio of at least 1.125:1 in comparison to a free-flowing loose-filled condition of the pellet/granular insulating material, whereby pellets/granules of the insulating material mutually engage and, interlock with one another, and the compressed insulating material provides a thermal insulating value (R value) substantially equal to EPS.

According to another aspect, the present invention provides a method of providing an improved insulating and cushioning shipping container, the method comprising steps of: providing an exterior cardboard box defining a cavity; disposing an inner cardboard box within the cavity, utilizing the inner cardboard box to define a product cavity; disposing a compressed mass of insulating material of pellet/granular form received in the cavity around the inner cardboard box; and arranging the compressed mass of insulating material to have a compression ratio of at least 1.125:1 in comparison to a free-flowing loose-filled condition of the pellet/granular insulating material, and utilizing compression of the mass of insulating material to mutually engage and interlock pellets/granules of the insulating material with one another, and further utilizing the compressed insulating material to provide a thermal insulating value (R value) substantially equal to EPS.

Other objects and features of the present invention will become apparent from consideration of the following description taken in conjunction with the accompanying drawings.

BRIEF DESCRIPTION OF THE DRAWING FIGURES

FIG. 1 presents a perspective view of an insulated shipping container according to the invention, having a portion of the container sectioned or broken away for clarity of illustration;

FIG. 2 is a cross sectional view of the container seen in FIG. 1, with the cross section taken along a vertical plane 2-2 of FIG. 1, extending transversely through the container;

FIGS. 3-14 are diagrammatic cross sectional views somewhat similar to FIG. 2, and illustrating steps in the process of manufacturing an insulated shipping container embodying the present invention;

Figure 17:
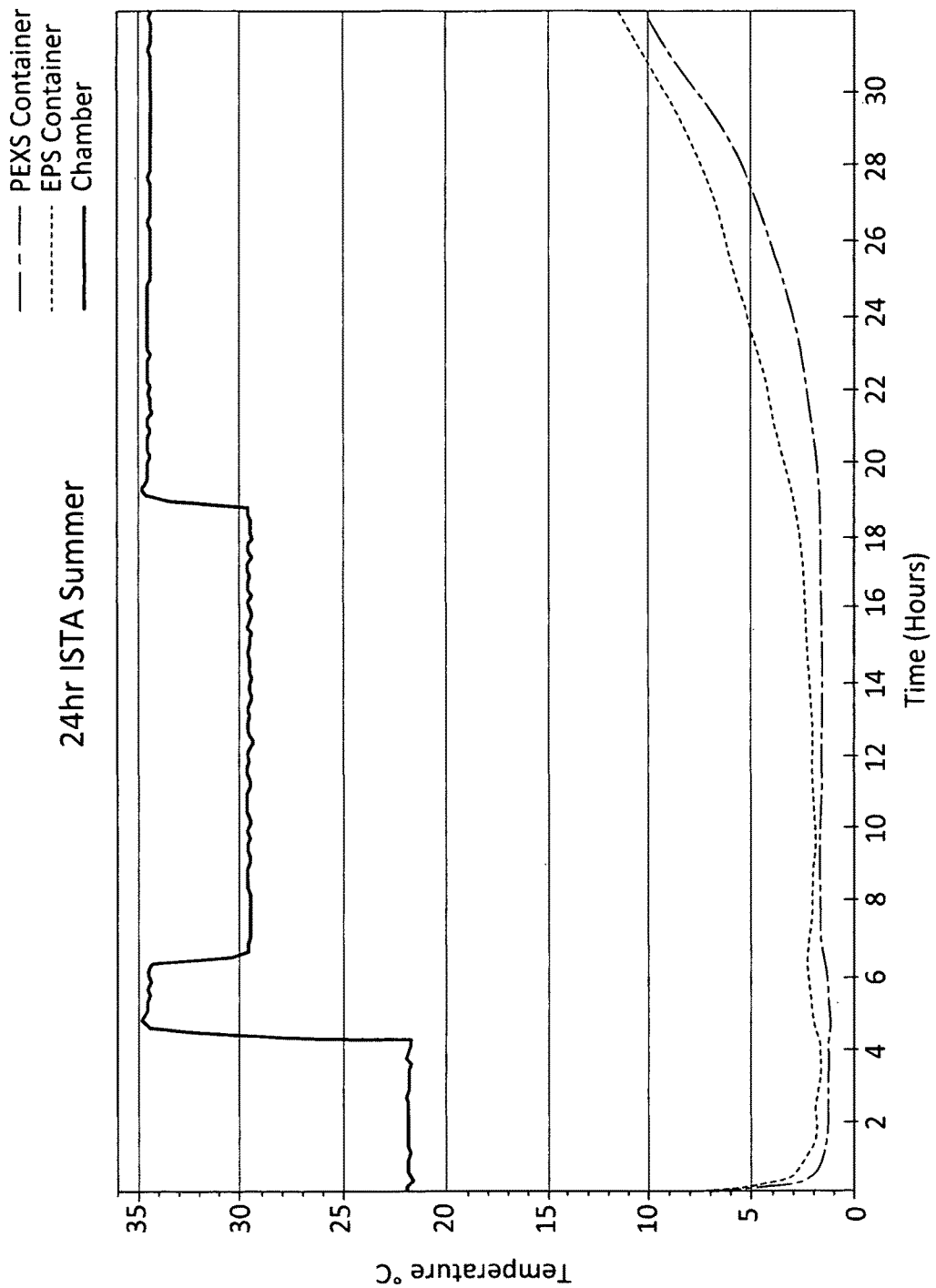

FIGS. 15, and 16 provide respective diagrammatic views of a conventional cushioning (i.e., packaging) or insulating "peanut" and of a pelletized or granular insulating element according to this present invention;

FIG. 17 is a graphical representation of the insulating performance of an insulated container embodying this invention in comparison to the performance of a conventional EPS container in an ISTA "summer" test cycle;

FIGS. 18 and 20, respectively, provide a sectioned perspective view, and a cross sectional view, each being similar to FIGS. 1 and 2, but showing an alternative embodiment of inventive shipping container; and FIG. 19 is a perspective view of a component part of the shipping container shown in FIGS. 18 and 20.

DETAILED DESCRIPTION OF THE PREFERRED EMBODIMENTS

Turning now to the drawings, and considering FIGS. 1 and 2 in conjunction, these Figures show a perspective view of an insulated shipping container 10 according to the invention, with FIG. 1 having a portion of the container sectioned or broken away in the corner nearest the viewer for clarity of illustration. In FIG. 2, a cross sectional view of the insulated container 10 is presented, with the plane of the cross section indicated generally at the dashed line 2-2 of FIG. 1—extending transversely across the container—and looking in the direction of the arrows. In FIG. 2, an article 12 to be shipped is shown within an internal cavity 14 of the container (to be further described below), sandwiched between a pair of refrigerated gel packs 16. The gel packs 16 are provided to control the temperature of the item 12 to an acceptably low level during transport.

Still considering FIGS. 1 and 2, an insulated shipping container 10 in accordance with the present invention generally includes an exterior cardboard (i.e., corrugated cardboard or paper board) shipping container or box 18, including plural (in this case, four) side walls each indicated with the numeral 18a. A bottom wall 18b is cooperatively formed by plural lower flaps 18c each hingeably attaching at a lower marginal extent of the side walls 18a. A top wall 18t (best seen in FIG. 2) is similarly formed cooperatively by plural flaps 18u hingeably attaching at an upper marginal extent of the side walls 18a. It will be noted that in this instance, the upper flaps 18u are alike to the lower flaps 18c, although the invention is not so limited. In FIG. 1, the top wall of the box 18 is shown in its open configuration. The side wall 18a thus are seen to cooperatively define an upper opening 18d, leading to a rectangular prismatic cavity 17.

As is seen in both FIGS. 1 and 2, generally centrally received into the cavity 17 of container 10 (i.e., within outer box 18) is a dimensionally smaller inner box 20, preferably also formed of cardboard or paper board. The construction of the inner box 20 is substantially like that of the outer box 18. In both FIGS. 1 and 2, the upper flaps 20u of the inner box 20 are illustrated to be closed, although those ordinarily skilled in the pertinent arts will understand that they can be opened as is shown for the outer box 18 in FIG. 1.

Closely considering now FIGS. 1 and 2 together, it is seen that adjacent to both the bottom wall 18b and side walls 18a of the outer box 18 (and interposed between these walls of the outer box 18 and the walls of the inner box 20) is a layer of insulation material (generally indicated with the numeral 22). This insulating material is indicated on FIGS. 1 and 2 to consist of several layers or "strata," indicated respectively with the numerals 22a, 22b, 22c, and 22d. These strata 22a-22d of insulating material are each formed as will be explained further below. But, for the present, it is to be understood that each strata consists of granular or pelletized insulating material that has been compressed "in situ" by a determined degree or amount from an initial "loose fill" or free-flowing condition.

As a predicate to the following description of a method of making the container 10, and in order to better appreciate and understand the significance of the selected or determined degree of compression of the granular insulating material 22 in the respective strata, attention may now be turned briefly to FIGS. 15 and 16. Although not to scale or to be understood or taken as precise representations, the insulating pellets, granules, or "peanuts" shown in FIGS. 15 and 16 are approximately full size. In FIG. 15 is shown a conventional or prior-art foamed or "puffed" cylindrical plastic cushioning "peanut 24" of the type generally used to cushion (and sometimes to insulate) items to be shipped. As is seen in FIG. 15, this conventional foamed pellet is about one inch to about one and one-half inches in length and has a diameter about one-half its length (both indicated by respective arrows on FIG. 15—with the length indicated in the vertical direction and the width or diameter dimension indicated in the horizontal direction). These conventional cushioning pellets have a bulk density of about 265.5 grams per cubic foot. When such conventional pellets are used to cushion or insulate an item to be shipped within a box the pellets are generally introduced or poured (i.e., free flowing condition) into the box around the item to be shipped in a "loose fill" condition, perhaps with a small excess of pellets to be pushed into the box when the flaps of the box are closed. This slight over filling of the box simply has the effect of somewhat resisting migration of the pellets around the item being shipped during the vibration of jostling of carriage. Consequently, settling or raising of the item being shipped within the bulk of the cushioning pellets is somewhat resisted. The over filling of the box with conventional cushioning pellets does not accomplish a consistent or uniform compressing of the conventional pellets. Further, a difficulty arises when the conventional pellets are used for insulation, in that their relatively large size and inconsistent pushing into the box as the box is closed (due to slight over filling) leaves a large interstitial or ullage volume inside the box. This large interstitial volume allows for air circulation around and among the conventional cushioning pellets and a provides a very poor insulation value.

On the other hand, consideration of FIG. 16 shows a preferred size for a cylindrical insulating pellet 26 to be used in the practice of this invention. This preferred insulating pellet is also made of foamed Material (as is to be further explained), and has a length of about five-eight of an inch or less, and a diameter of about one-half of its length (both indicated by respective arrows on FIG. 16). Significantly, this preferred insulating pellets have a bulk density in their "loose fill" free flowing condition from about 287.5 grams per cubic foot to over 400 grams per cubic foot. Accordingly, because the foam from which the pellets of FIGS. 15 and 16 are made is substantially the same, it is to be appreciated that the pellets of FIG. 16 appear to have a substantially smaller or decreased ullage volume (or interstitial volume) compared to the pellets of FIG. 15. The bulk density, or weight per cubic foot, of the insulating pellets of FIG. 16 is from about 10% higher to about 150% higher than the cushioning pellets of FIG. 15.

Even more significantly, a multitude of the preferred insulating pellets 26 as seen in FIG. 16 are disposed in the container 10 in a compressed bulk form in order to cooperatively form the strata 22a-22d. These strata of compressed pellets each have a selected or desired degree of compressing (or compression) from the "loose fill" condition of pellets 26, and the compression of pellets 26 in the strata 22a-22d is substantially uniform. As a result, the strata 22a-22d exhibit a much lower interstitial volume than can be accomplished with conventional pellets or peanuts as seen in FIG. 15. Further, because of the selected or desired degree of compression of the pellets 26 in the strata 22a-22d, the pellets are effectively "locked" into engagement with one another, and migration of the pellets 26 comprising strata 22a-22d is positively prevented.

Figure 3:
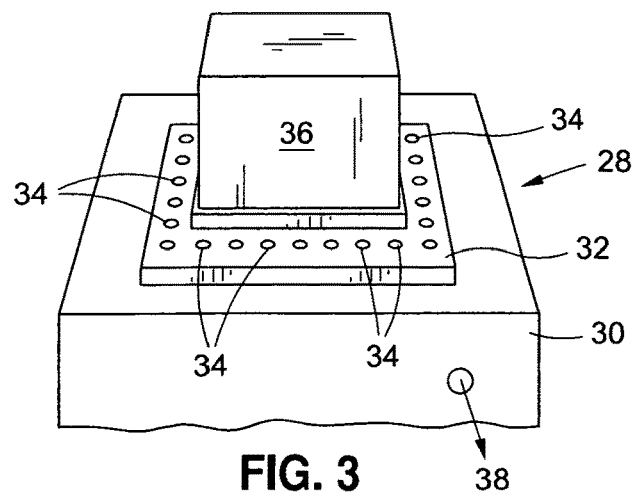
Figure 4:
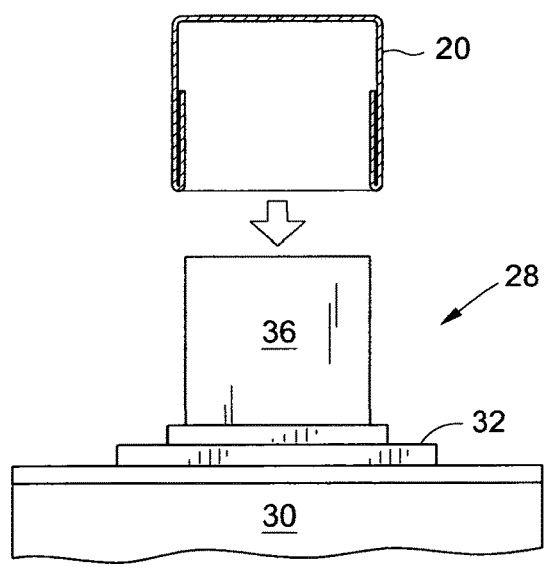
Figure 5:
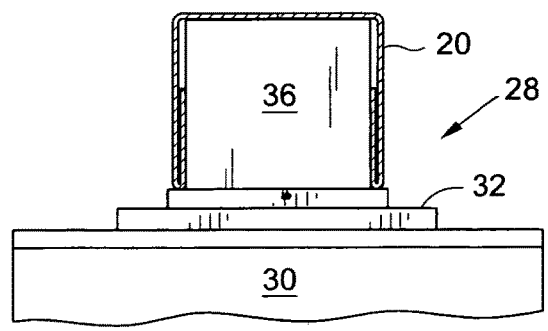

Turning now to FIG. 3, a tool 28 to be used in making the container 10 is diagrammatically illustrated. The tool 28 consists of a hollow base 30 carrying a plateau 32 penetrated by an array of vacuum holes 34, circumscribing an upstanding mandrel 36. Arrow 38 indicates communication of the hollow base 30 to a controllable vacuum source. FIG. 4 shows that the mandrel is sized to slip closely in supporting relationship within the inner box 20. That is, the inner box 20 in inverted orientation is slipped over the upstanding mandrel 36, as is indicated by the movement arrow on FIG. 4. FIG. 5 illustrates in cross section the inner box 20 in place on mandrel 36, and upon plateau 32 on base 30. It will be noted that the plurality of vacuum holes 34 also circumscribe the inner box 20.

Figure 6:
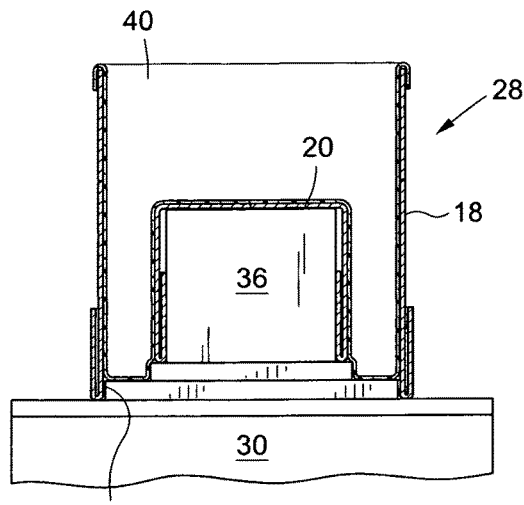

FIG. 6 illustrates a subsequent step in the method of making container 10, in which the outer box 18, also in inverted orientation, is placed on the base 30, with the plateau 32 fitting within the upper (now oriented downwardly) opening 18d. The vacuum holes 34 are thus disposed within the outer box 18 (i.e., between the inner box 20 and outer box 18). In this orientation of the outer box 18, the bottom wall 18b (i.e., formed by bottom flaps 18c) is open upwardly, as is seen in FIG. 6. A pliable bag 40 of film material is introduced over the inner box, spanning across the plateau 32 and vacuum holes 34, and extending upwardly on the open bottom flaps 18c, to embrace (i.e., be folded over) these bottom flaps 18c.

Figure 7:
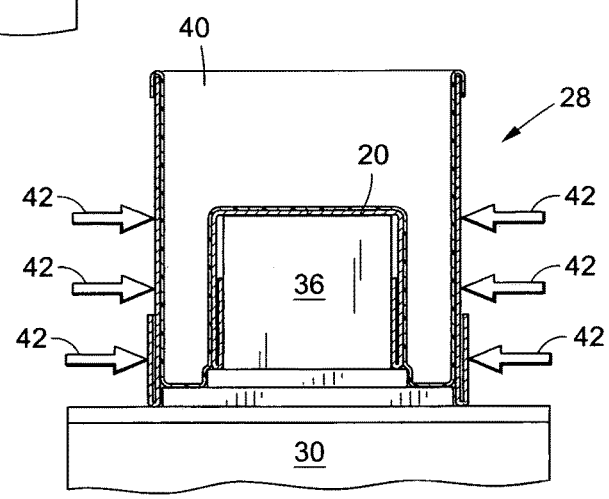

Subsequently, as is seen in FIG. 7, the bottom flaps 18c are forming the upwardly oriented opening of the bag 40 into an entrance to the upwardly disposed bag 40 and bottom of the box 18, as is best seen in FIG. 7. At this time, structural support for the side walls 18a of box 18 is provided, as is indicated on FIG. 7 by the plurality of arrows 42. The arrows 42 do not indicate that inward force is applied to the side walls 18a, but simply that these side walls 18a are supported against outward movement or bulging.

Figure 8:
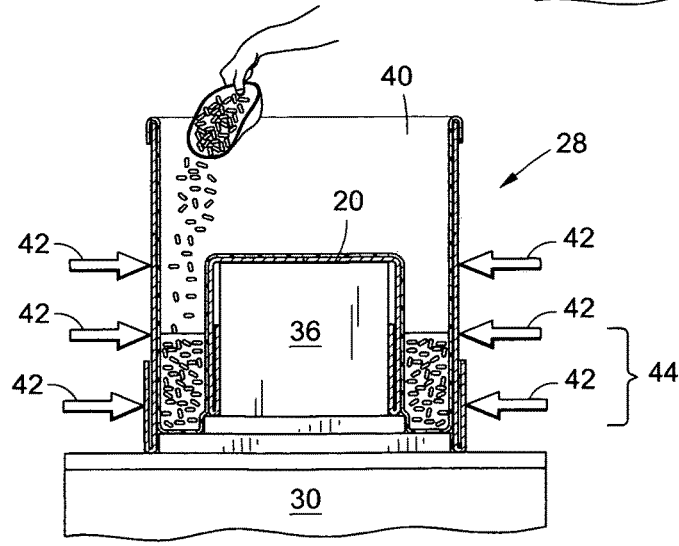
Figure 9:
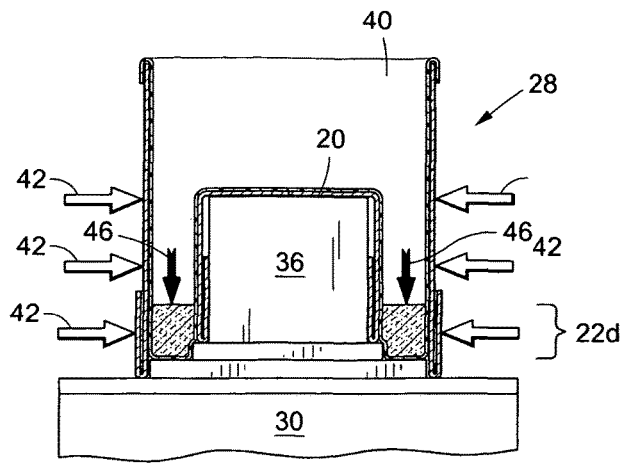

FIG. 8 diagrammatically illustrates that the vacuum source 38 has been turned on, at least momentarily, in order to pull the film bag 40 into embrace with the inner box 20, the plateau 32, and the outer box 18. The timing of this application of vacuum is not critical, and can be performed as part of the steps illustrated in any one or all of FIGS. 6 through 8. As seen in FIG. 8, a first (i.e., upper) strata 44 of loose-filled granular or pelletized insulating material (i.e., plural pellets 26 as seen in FIG. 16) are being filled into the space between the inner box 20 and outer box 18 within the film bag 40. As is indicated by the depth of this strata 40 in comparison with the strata 22d seen best in FIG. 2, it is to be appreciated that in the loose-filled condition of the strata 44, the depth is considerably greater than the depth of corresponding strata 22d. However, as FIG. 9 illustrates, the strata 44 of loose-filled pellets 26 is compressed by substantially uniform application of downwardly directed force (indicated on FIG. 8 with the arrows 46). It is to be noted that the compression force and movement indicated by arrows 46 is applied substantially uniformly across the upwardly exposed surface of the strata 44 and around the circumference of the strata 44 between the inner box 20 and outer box 18. That is, the pellets 26 are substantially uniformly compressed in strata 44 from their loose-filled, free-flowing condition to a compressed or compacted condition, producing the strata 22d. As will be further explained, the strata 44 of loose-filled pellets or granules 26 is thus compressed to a sufficient degree (to be further explained below) that the upper strata 22d is produced. The strata 22a-22d of multiple pellets 26 thus compressed or compacted will be recognized as effective thermal insulation (i.e., inhibiting heat transfer) disposed between the inner box 20 and outer box 18.

Figure 10:
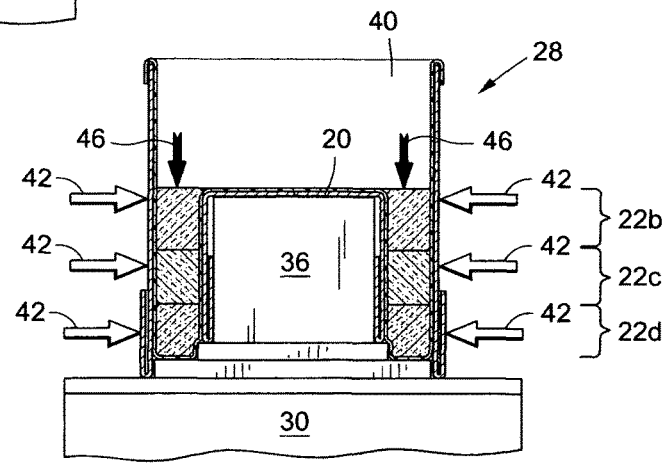

FIG. 10 illustrates that by subsequent repeated application of the method steps indicated in FIGS. 8 and 9, the subsequent strata 22c and 22b are produced in the volume (i.e., in that circumferential space) surrounding inner box 20 and within outer box 18. During the compression of these strata 22, the support (arrows 42) prevent the compression force (arrows 46) from resulting in the side walls 18a of box 18 being pushed or bulged outwardly by transferred compression force.

Figure 11:
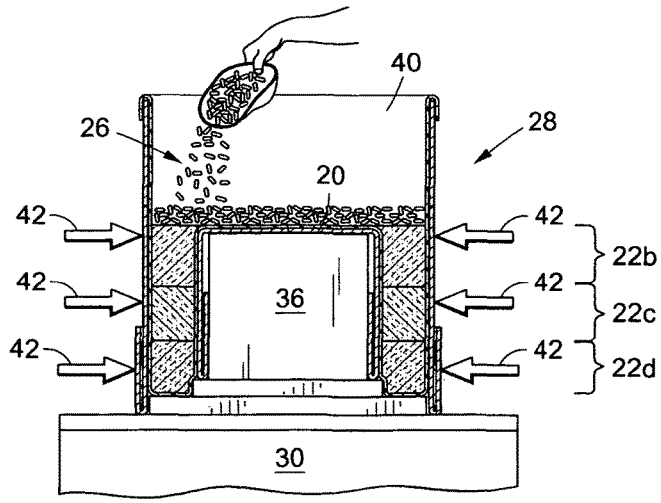

Turning to FIG. 11, the provision of the strata 22a within box 18 is illustrated. Again, loose-filled pellets 26 are provided to a depth greater than the desired thickness of strata 22a, in order to accomplish substantially the same compression of the pellets 26 as has been done for strata 22d, 22c, and 22b (in the order of the creation of these strata). However, as FIG. 11 illustrates, in order to create the strata 22a, the loose filled pellets 26 are captured inside of the material of the film bag 40, which is gathered and folded over these loose-filled pellets 26 of strata 22a. The bottom flaps 18b of box 18 are then forcefully closed (refer to FIG. 12) on the loose-filled pellets 26 of the strata 22a, and force is applied (indicated by arrows 48) in order to bring the bottom flaps 18b of box 18 into position as seen in FIG. 12. In this way, the strata 22 is subjected to substantially the same degree or amount of compression of the pellets 26 as are the other strata 22d, 22c, and 22b.

Finally (as is indicated by the action arrows 50 on FIG. 13), a plurality of conventional plastic filament securing devices (or staples) 52 is inserted downwardly from the outside of box 18. These staples are inserted through the folded-closed bottom flaps 18a of box 20, through the strata 22a of compressed pellets 26, and through the bottom of box 20. Each of the plastic filament devices 52 have a spaced apart end pair of integral cross bars or tie bar portions, which respectively engage the bottom flaps of outer box 18 and the bottom of inner box 20. Thus, maintaining the position of inner box 20 within the outer box 18, and within the plural strata 22a-22d of compressed pellets 26 is assured. An advantage of this "stapling" of the inner box 20 into position within outer box 20 is that in the event that the shipping container is jostled during handling, or a worker were to tug on the flaps of inner box 20 during filling of this box, for example, the inner box 20 is not easily dislodged from its proper position within the strata of pellets 22a-22d.

Turning now to FIG. 14, it is seen that the container 10 has been removed from the tool 8, and has been turned over to its normal or upright orientation. In this orientation, the item 12 to be shipped, as well as any temperature control packs 16 to be utilized can be placed into the inner box 20 (recalling FIG. 2). The upper flaps of the inner box 20 are then closed (or alternatively, in the event an inner box 20 without top flaps has been used, a closure piece of flat cardboard (not seen in the drawing Figures) is employed to span and close the opening of inner box 20). Subsequently, a generally flat and correspondingly sized film bag 54 having an outer film layer 56 (i.e., like the film of bag 40) and an inner filling (not visible in the drawing Figures) of loose-filled insulating pellets 26 is provided. This generally flat bag 54 is placed in the top of box 18 atop of the upper strata 22d of compressed pellets, and atop of the closed inner box 20. Desirably, this bag 54 has a volume greater than the remaining space within outer box 18, generally according to the desired compression to be accomplished for the insulating pellets 26—recalling the description of compressed strata 22a-22d provided above. Once the bag 54 is placed into the opening of box 18, the upper flaps 18u are folded over the bag 54, and vertically downwardly directed force (arrows 58 of FIG. 2) is applied both to compress the pellets 26 of insulating material within bag 54, and to conform the shape of bag 54 to the shape of the remaining space within box 18 (i.e., atop of strata 22d and atop of the closed inner box 20), viewing FIG. 2). Further, it is to be noted that the bag 54 has provisions for allowing air trapped therein to escape during the compression of this bag and the pellets therein to the desired shape. Expedients that have been used are to have a few needle punches or slits formed in the film 56 from which the bag 54 is made.

It will be noted in FIG. 2, that as compressed into place, the bag 54 takes on a stepped or rabbeted shape, with an upper peripheral portion 54a which is highly compressed atop of strata 22d, and an inner portion 54b which is not so highly compressed atop of the closed inner box 20. Thus, a desirable air or respiration sealing engagement of bag 54 is accomplished with the strata 22d of compressed pellet insulation within the box 18. Once the flaps 18u have been closed, adhesive tape may be employed to retain these flaps in their closed positions. It is to be noted that although the film bags 40 and 54 are not impermeable, they do provide a barrier against moisture migration into the container 10, thus minimizing condensation of liquid water within the cavity 14. The bags 40 and 54 also are believed to contribute to retention of sublimation gas within the container 10 when dry ice is utilized as a cooling agent, further contributing to a desirable increase in the R value of the container 10. Also, it is to be noted that a variety of bags 40, 54, made of a variety of film materials, may be utilized in making the insulated container 10 according to this invention, and indeed, a container according to this invention may be made without using a bag 40 at all, as will be further explained.

Recalling the disclosure above of the foamed nature of the pellets 26, it is to be noted that most preferably, the insulating pellets 26 are formed of foamed or "puffed" vegetable starch. A most preferred material for making the insulating pellets 22 is corn starch. In the event the pellets 26 are made of corn starch, then a desired compression for these pellets is at least 1.125:1. A higher compression ratio may be employed as is explained below. On the other hand, alternative vegetable and natural materials may be employed to make the pellets 26, or to make a granular or pellet form of insulating material for us in container 10. One material that has been employed successfully to make pellets 26 is sorghum starch. In the event that sorghum is utilized to make the pellets 26, then a desired compression for these pellets is substantially at least 1.125:1. Experimentation has shown that for relatively small containers 10, a compression ratio for sorghum based pellets is 1.25:1 is particularly satisfactory in providing an insulation value as good as or better than EPS. For larger containers 10 (i.e., larger than about 10 inches in any direction), a compression ratio or 1.35:1 provides the desired insulation value (i.e., equal to or better then EPS). Similarly, while the film for bags 40 and 54 (i.e., film 56) may be made of a variety of materials, the most preferred material for making this casing is also a flexible corn starch film, which is biodegradable. Alternatively, the film for bags 40 and 54 may be made of a commercially available polyethylene sheeting having an ingredient added so that it biodegrades quickly.

Further considering the compression of pellets 26, and the substantial reduction in interstitial volume or space achieved, it will be understood that when such insulating pellets are loose-filled together into a space or volume, they define considerable interstitial spaces, and these interstitial spaces communicate with one another. Moreover, although the communicating interstitial spaces define tortuous communication pathways through a layer of such pellets, a considerable air circulation can take place, and the insulating value of loose-filled pellets is not satisfactory. Testing has confirmed this assertion. On the other hand, FIG. 17 graphically illustrates a performance comparison for a container made according to this present invention versus a conventional EPS container. Both containers were cooled by a matching quantity of dry ice. The test protocol, generally, is the 24 hour ISTA Summer test, which has been made more severe for test purposes by extending the test beyond 24 hours (i.e., by more than an additional 6 hours), and by keeping the temperature of the test chamber at its highest level in the interval beyond 24 hours. Considering FIG. 15, it is seen that throughout the entire 24 hour ISTA Summer test, the temperature within a container 10 according to this invention remains desirably lower than the temperature within a comparable insulated container made of EPS. As the ISTA Summer test is drawing to a close, near the last hours of this standard test cycle, the container embodying this invention maintains a considerably lower internal temperature. In fact, at least for an additional 6 hours (until the test was terminated), the insulated container according to this present invention maintained a significant advantage over the conventional EPS container.

Further to the above, it has been discovered in the course of making and testing containers according to this invention that the compressed or compacted nature of the natural vegetable insulating materials utilized appears to result in a favorable retention of the sublimation gas (i.e., carbon dioxide) released when dry ice is utilized in the container for cooling purposes. That is, the cool carbon dioxide resulting from sublimation of the dry ice is not allowed to easily escape from the container because of respiration or free-flowing circulation or permeation of the container is inhibited. Thus, the cool carbon dioxide is retained more effectively in the container 10 (i.e., in the insulation of the container as well), and warm outside air is apparently inhibited from respiration into the container 10. The result is an increase or improvement in the insulating value (i.e., "R" value) of the container. Still further, it has been determined that materials other than the mentioned corn or sorghum materials may be utilized to form a granular or pellet form of insulating material for this present invention. That is, materials such as corn husks, corn stalks, coffee husks, coconut husks, cotton fibers (waste or recycled), and mushrooms could be used to make insulation material according to this invention. All of these alternative insulating materials are also biodegradable/compostable.

Turning now to FIGS. 18, 19, and 20 in conjunction, these Figures show a sectioned perspective view, and a cross sectional view of an alternative embodiment of insulated shipping container 10' according to the invention. FIG. 19 illustrates a component part of the insulated container 10'. Viewing FIGS. 18 and 20 in comparison with FIGS. 1 and 2, it is immediately seen that the two embodiments of the invention thus illustrated are very similar. Because of the similarity of the two embodiments of inventive shipping container, the same reference numerals employed earlier to indicate features of the first embodiment are utilized for the embodiment of FIGS. 18 and 20, but with a prime (') added. However, the embodiment of FIGS. 18 and 20 does not employ a bag 40 to contain the pellets 26. Instead, the embodiment of FIGS. 18 and 20 does utilize a cardboard partition member 60, as is best seen in FIG. 19. This cardboard partition member 60 is sized and shaped to span and substantially close the circumferential, peripheral space between inner box 20' and outer box 18' (viewing FIG. 18).

Turning to FIG. 19, it is seen that the partition member 60 includes a central opening 62 sized and shaped to receive the inner box 20'. As FIG. 18 shows, the cardboard partition member 60 is disposed substantially co-extensively with or co-planar with the top of box 20'. Into this central opening 62 projects a plurality of integral tabs 64, which can be seen in FIG. 18 (i.e., in dashed lines) folded downwardly so that they, enter matchingly positioned slots formed in the top of inner box 20'. These tabs 64 may alternatively or additionally be glued to the box 20'. Also viewing FIG. 19, it is seen that the partition member includes outwardly projecting integral tab portions 66, which in FIGS. 18 and 20 can be seen to engage into matchingly positioned slots defined by the outer box 18'. Again, the partition member 60 may alternatively or additionally be glued to the inside of outer box 18'. Thus, the upper extent of the compressed or compacted strata 22b' of pellets 26 is protected by the cardboard partition member 60. The partition member 60 assists in retaining the inner box 20' with in the outer box 18'. So, the box 10' may or may not utilize staples 52, like were utilized by the first embodiment. Experience has shown that the cardboard partition member 60 by itself is sufficient in many uses of the container 10' to secure the inner box 20' during handling and preparations of the container 10' for use and during shipping.

While the invention is susceptible to various modifications, and alternative forms, a specific example thereof has been shown in the drawings and is herein described in detail. It should be understood, however, that the invention is not to be limited to the particular forms disclosed, but to the contrary, the invention is to cover all modifications, equivalents and alternatives falling within the spirit and scope of the appended claims.

I claim:

1. An improved insulated and cushioning shipping container, said shipping container comprising:
    an exterior cardboard box defining a cavity;
    an inner cardboard box within said cavity, said inner cardboard box defining a product cavity;
    a compressed mass of compostable insulating material of pellet/granular form received in said cavity and around said inner cardboard box with said pellets/granules of said insulating material mutually engaging and interlocking with one another;
    said compressed mass of compostable insulating material having a compression ratio of at least 1.125:1 in comparison to a free-flowing loose-filled condition of the pellet/granular insulating material and sufficient to provide said compressed insulating material with a thermal insulating value (R value) substantially equal to EPS; and
    plural filamentary staples extending between and securing said exterior cardboard box and said inner cardboard box together.

2. The insulated shipping container of claim 1 wherein said insulating material is made of a vegetable material selected from the group consisting of: corn, sorghum, corn husks, corn stalks, coffee husks, coconut husks, cotton fibers, and mushrooms.

3. The insulated shipping container of claim 2 wherein said insulating material is made of corn, and said compression ratio is at least 1.125:1 or greater.

4. The insulated shipping container of claim 2 wherein said insulating material is made of sorghum, and said compression ratio is at least 1.125:1, or greater.

5. An improved insulated and cushioning shipping container, said shipping container comprising:
    an exterior cardboard box defining a cavity;
    an inner cardboard box within said cavity, said inner cardboard box defining a product cavity;
    a compressed mass of compostable insulating material of pellet/granular form received in said cavity and around said inner cardboard box with said pellets/granules of said insulating material mutually engaging and interlocking with one another;
    said compressed mass of compostable insulating material having a compression ratio of at least 1.125:1 in comparison to a free-flowing loose-filled condition of the pellet/granular insulating material and sufficient to provide said compressed insulating material with a thermal insulating value (R value) substantially equal to EPS, wherein said compressed mass of insulating material as disposed in said cavity includes at least two strata of compressed pellets/granules of insulating material, and wherein said at least two strata are formed substantially in parallel to a bottom surface of said cavity; and plural filamentary staples extending between and securing said exterior cardboard box and said inner cardboard box together.

6. The insulated shipping container of claim 1 further including a film bag lining said exterior cardboard box, and surrounding said inner cardboard box.

7. The insulated shipping container of claim 6 wherein said film bag is made of vegetable material, and is biodegradable/compostable.

8. The insulated shipping container of claim 1 further including a partition member spanning a circumferential gap defined between said exterior cardboard box and said inner cardboard box, and said partition member overlying said compressed mass of insulating material of pellet/granular form.

9. The insulated shipping container of claim 8 wherein said partition member is formed of cardboard and secures to each of said exterior cardboard box and to said inner cardboard box.

10. An improved insulated and cushioning shipping container, said shipping container comprising:

an exterior cardboard box defining a cavity;

an inner cardboard box within said cavity, said inner cardboard box defining a product cavity;

a compressed mass of compostable insulating material of pellet/granular form received in said cavity and around said inner cardboard box with said pellets/granules of said insulating material mutually engaging and interlocking with one another;

said compressed mass of compostable insulating material having a compression ratio of at least 1.125:1 in comparison to a free-flowing loose-filled condition of the pellet/granular insulating material and sufficient to provide said compressed insulating material with a thermal insulating value (R value) substantially equal to EPS, wherein said compressed mass of insulating material of pellet/granular form received in said cavity and around said inner cardboard box includes plural strata; said plural strata including a first strata of compressed insulating material of pellet/granular form, and a second strata overlying said first strata and also including compressed insulating material of pellet/granular form, and wherein said first strata and said second strata are formed substantially in parallel to a bottom surface of said cavity; and plural filamentary staples extending between and securing said exterior cardboard box and said inner cardboard box together.

11. The insulated shipping container of claim 1, wherein said insulating material of pellet/granular form comprises vegetable-based pellets made substantially of foamed corn starch, and said pellets are compressed/compacted by a ratio of substantially 1.25:1 or greater compared to the loose-filled, free-flowing condition of said pellets.

12. The insulated shipping container of claim 1, wherein said insulating material of pellet/granular form comprises vegetable-based pellets are made substantially of foamed sorghum starch, and said pellets are compressed/compacted by a ratio of substantially 1.25:1 to about 1.35:1 compared to the loose-filled, free-flowing condition of said pellets.

13. The insulated shipping container insulation of claim 1 wherein said insulating material of pellet/granular form includes generally cylindrical pellets each about ⅝ inch long and about half as large in diameter as their length, and said pellets have a bulk density in their loose-fill, free-flowing condition in a range from about 288 grams per cubic foot to about 440 grams per cubic foot.

14. A method of providing an improved insulating and cushioning shipping container, said method comprising steps of:

providing an exterior cardboard box defining a cavity;

disposing an inner cardboard box within said cavity, utilizing said inner cardboard box to define a product cavity;

disposing a compressed mass of compostable insulating material of pellet/granular form received in said cavity around said inner cardboard box with said pellets/granules of said insulating material mutually engaging and interlocking with one another;

arranging said compressed mass of compostable insulating material to have a compression ratio of at least 1.125:1 in comparison to a free-flowing loose-filled condition of the pellet/granular insulating material and sufficient to provide said compressed insulating material with a thermal insulating value (R value) substantially equal to EPS; and securing said exterior cardboard box and said inner cardboard box together with plural filamentary staples extending between said exterior cardboard box and said inner cardboard box.

15. The method of claim 14 further including the step of first partially filling said cavity around said inner cardboard box with pellets of foamed vegetable insulating material in pellet/granular form and in loose-filled/free-flowing condition, and compressing/compacting said first partial filling of pellets of foamed vegetable insulating material by a ratio of at least 1.125:1 to provide a first strata of insulating material;

secondly partially filling said cavity around said inner cardboard box and atop of said first strata with pellets of foamed vegetable insulating material in pellet/granular form and in loose-filled/free-flowing condition, and compressing/compacting said second partial filling of pellets of foamed insulating vegetable material again by a ratio of at least 1.25:1 to provide a second strata of insulating material.

16. The method of claim 14 further including the step of providing a moisture resistant film surrounding said inner cardboard box and within said exterior cardboard box, and fabricating said moisture resistant film of material which is biodegradable/compostable.

17. The method of claim 14 further including the step of providing a partition member spanning a circumferential gap defined between said inner cardboard box and said exterior cardboard box, and utilizing said partition member to overly and constrain said compressed mass of insulating material.

* * * * *

UNITED STATES PATENT AND TRADEMARK OFFICE
CERTIFICATE OF CORRECTION

PATENT NO. : 10,392,177 B2
APPLICATION NO. : 14/756163
DATED : August 27, 2019
INVENTOR(S) : Gary W. Lantz Page 1 of 1

It is certified that error appears in the above-identified patent and that said Letters Patent is hereby corrected as shown below:

In the Claims

Column 12, Line 7, Claim 13, after container, please delete "insulation".

Signed and Sealed this
Twenty-ninth Day of October, 2019

Andrei Iancu
*Director of the United States Patent and Trademark Office*